Dec. 19, 1950     M. WALLACE     2,534,843
GATED DUAL SYNCHROMETRIC SYSTEM
Filed Oct. 24, 1947     5 Sheets-Sheet 1

FIG. 1

*INVENTOR.*
MARCEL WALLACE
BY

Dec. 19, 1950     M. WALLACE     2,534,843
GATED DUAL SYNCHROMETRIC SYSTEM Filed Oct. 24, 1947     5 Sheets-Sheet 2

FIG. 2

*INVENTOR.*
MARCEL WALLACE
BY

FIG. 3

INVENTOR.
MARCEL WALLACE

Dec. 19, 1950  M. WALLACE  2,534,843
GATED DUAL SYNCHROMETRIC SYSTEM
Filed Oct. 24, 1947  5 Sheets-Sheet 4

INVENTOR.
MARCEL WALLACE
BY

Patented Dec. 19, 1950

2,534,843

UNITED STATES PATENT OFFICE 2,534,843

GATED DUAL SYNCHROMETRIC SYSTEM

Marcel Wallace, East Port Chester, Conn., assignor of one-half to Panoramic Radio Corporation, Mount Vernon, N. Y., a corporation of New York Application October 24, 1947, Serial No. 781,837

43 Claims. (Cl. 343—101)

This application is a continuation-in-part of my prior application entitled Dual Synchrometic System, filed October 10, 1947, and to which has been assigned Serial No. 779,174.

The present invention relates generally to telemetric systems and more particularly to gated dual synchrometic telemetric systems wherein values of a pair of measurable quantities are transmitted in terms of the time position of a single transmitted pulse which may be translated at a remote point into an indication or a record of values of the quantities, and wherein at the remote point determinable ranges of values of either or both of the quantities may be excluded from the indications or the record.

The invention further relates generally to systems of the above character wherein information derived from a map chart or other simulation of terrain or the like may be transmitted in superposed relation with the transmissions relating to measurable quantities and indicated or recorded in like superposed relation.

Broadly described, my invention involves production of two sets of pulses, each set pertaining to one of the measured quantities, and the time positions of pulses within each set being determined in accordance with the value of one of the quantities. The time positions of pulses within the separate sets is determined, however, with respect to entirely different time bases, or basic time intervals, which may be of integral multiple length relation, one of the other, and of locked relative phase. If we assume the time intervals of the different sets to have a ratio of durations of 30:1, for the sake of example only, and to commence from a common zero, every thirtieth short interval may be set to terminate at precisely the instant of commencement of a long interval. If now periodic impulses are generated at time positions within the short intervals determined by the value of the measurable quantities; and if further periodic pulses be generated at time positions within the long intervals determined by the value of a further measurable quantity, and if only that short interval pulse is transmitted which is generated in substantial coincidence with a pulse belonging to the long interval set, no pulses of the latter set being transmitted, the transmitted pulse will have a time interval within one of the short time intervals which is precisely in accordance with the measured quantity pertaining to short interval pulses and will have a time position within the long interval substantially corresponding with the value of the measured quantity pertaining to the long interval pulses.

At a receiving station the time positions of received pulses may be measured with respect to both the short and the long time intervals separately to determine the values of the two measured quantities, the time position of a pulse with respect to a long interval representing the value of one of the quantities and the time position of that same pulse with respect to the commencement of one of the short time intervals representing the other of the quantities.

The pulse receivers at the receiving-indicating stations may each be provided with a pair of cascaded channels which are normally closed and which may be gated open in response to gating pulses. The gating pulses themselves may be provided in various ways. For example, a gating wave may be provided, at any station, under control of pulses transmitted by that station or under control of the value of the telemetric quantities measured at that station, so that only those remotely originating impulses having time values, within either or both of the basic time intervals, which are adjacent to the time positions of the pulses transmitted by the stations, may be received at the stations. Additionally, further time gates may be provided which may be manually controlled in respect to time position within the base time intervals, and also in respect to time duration within the base time intervals, permitting acceptance of telemetric pulses from remote stations within any desired range of values, and excluding telemetric pulses having values falling outside the desired ranges.

As a further optional step in the development of the present system the various transmitters may be tunable in accordance with the value of a third telemetric quantity, pulse receivers being likewise tunable to permit selective reception of pulses from certain of the transmitters only. In one proposed application of the invention, for example, pulse transmitters and receivers aboard each of a plurality of aircraft may be tunable in accordance with the altitudes of the aircraft so that transmission and reception of pulses may take place only between aircraft at the same or adjacent altitudes. The transmitted pulses may represent in terms of their time positions range and bearing of the aircraft with respect to a predetermined geographic location, whereby each craft will transmit to all other craft having an altitude similar to its own altitude, information concerning its range and bearing, and may receive similar information from all aircraft flying within its altitude layer.

Provision may be made for manually tuning the pulse receivers aboard the various aircraft to enable selective communication of range and bearing information from aircraft in remote layers of altitude.

In applying my system to the problem of air traffic control or air navigation, I may further provide transmissions, from a ground station, of information pertaining to terrain and this information may be provided for each of the separate altitude layers in a manner significant for aircraft flying within that layer only. The terrain significant information may be received by the telemetric receivers aboard the several aircraft of the system and recorded and indicated in superposed relation to the telemetric information provided by the received telemetric pulses.

Indications aboard the various aircraft as well as at the ground station may be provided in the form of plan position indications, showing range against bearing either on the face of a cathode ray tube indicator or in some analogous manner.

It is, accordingly, a primary object of the invention to provide a telemetric system wherein the time position of a single pulse represents the values of a pair of discrete quantities.

It is a further object of the invention to provide a gated synchrometric telemetering system utilizing a single recurring pulse time position as a measure of the values of a plurality of quantities.

It is still a further object of the invention to provide a gated time position modulating system wherein the time positions of pulses are determined simultaneously with respect to a plurality of discrete time intervals and wherein a plurality of cascaded gating means having gating waves timed with respect to each of the discrete time intervals is provided.

It is another object of the invention to provide a synchrometric system of communication having a receiving and translating system for translating the time position of a single pulse into a plurality of values, by comparison of the time position of that pulse with the extent of a plurality of different base time intervals, and wherein the receiving and translating system may be separately time gated with respect to each of the different base time intervals by means of a cascaded gating system.

It is a more specific object of the invention to apply the principles and concepts above conveyed to improved systems of air traffic control, and a radio aid to navigation, and particularly to improved systems for transmitting from each of a plurality of aircraft telemetric systems representing navigational parameters of the craft and for receiving and translating the telemetric signals aboard other craft and at ground stations in terms of visual indications of the values of the navigational parameters and in terms further of selected ranges of values of one or both of the navigational parameters.

It is still a further object of the invention to provide a system of air navigation wherein significance of terrain character information may be transmitted from the ground to the aircraft, and particularly wherein terrain significant information of interest to aircraft at a given altitude are transmitted at a corresponding altitude representative frequency, to enable aircraft flying at any altitude to perceive the presence and relative positions of adjacent aircraft, as well as the presence and relative positions of terrain features, significant at that altitude.

It is another object of the invention to provide a system of air navigation wherein telemetric or navigational information is transmitted from each of a plurality of aircraft to the remainder of the plurality, information originating in different altitude layers being differently characterized, to enable selective communication between aircraft, selection being accomplished in accordance with altitude.

It is still a further object of the invention to provide a system of air navigation wherein telemetric or navigation information is transmitted from each of a plurality of aircraft to the remainder of the plurality, information originating at different altitude layers being differently characterized, to enable selective communication between aircraft, selection being accomplished in accordance with frequency of transmitted pulses.

The above and still further objects and advantages of the invention will become apparent upon study of the following detailed description of specific embodiments of my invention, especially when taken in conjunction with the accompanying drawings, wherein.

Figure 1:
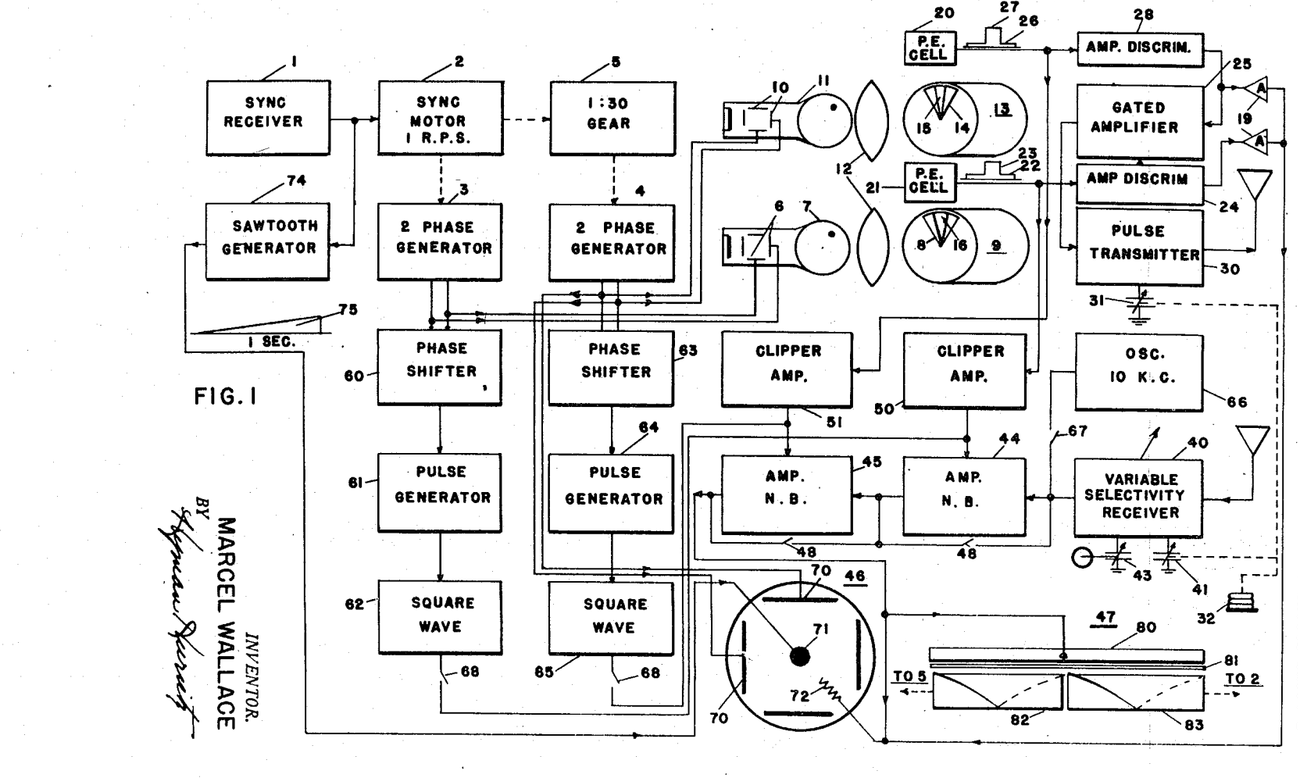
Figure 1 is a functional block diagram of an airborne transmitting and receiving gated dual synchrometric system arranged in accordance with one embodiment of the invention.

Referring now to Figure 1 of the drawings, wherein is illustrated in schematic block diagram an equipment suitable for installation aboard an aircraft and in accordance with the present system, the reference numeral 1 represents a sync signal receiver which may receive signals from a remote transmitter (not shown), these signals taking the form of pulses occurring once every second. The output of the sync signal receiver 1 is applied to a motor 2 and synchronizes the latter so that it rotates at the rate of one revolution per second. The motor 2 drives the two-phase generator 3; the motor 2 further drives a two-phase generator 4, over a 30:1 speed increase gear 5 and by reason of the gear locking between the two-phase generator 3 and the two-phase generator 4, the relative phases of the two generators 3 and 4 are likewise relatively locked. The output of the generators 3 and 4 establish long and short time base intervals required for operation of the dual synchrometric system, aboard the aircraft. The output of the generator 3 is applied to the deflecting electrodes 6 of a cathode ray tube 7, accomplishing a continuous and periodic rotation of the beam of the tube about a circle of predetermined radius. The beam of the tube impinges upon a low retention fluorescent screen associated with the tube 7, producing a very intense spot of light which travels about a circle at the rate of one revolution per second and serves to scan the position of a pointer 8 of a meter 9. In its broader application, the meter 9 may measure the value of any telemetric quantity desired. However, for the sake of example, and in explaining the present system, the meter 9 may be considered as being supplied with information enabling it to indicate the value of range of the aircraft concerned with respect to a fixed geographic location.

The output of generator 4 is applied to the deflecting electrodes 10 of the cathode ray tube 11, enforcing a rotary motion of the beam of the tube, which, impinging on the low retention or fast fluorescent screen of the tube 11 creates a moving spot which moves at the rate of thirty revolutions per second, by reason of the like frequency of the generator 4. The spot of light created on the face of the tube 11 is applied over a collimating lens 12 to the face of a meter 13 and passes periodically over the pointer 14 of the meter 13 precisely as does the rotating spot associated with the tube 7 in relation to the pointer 8 of the meter 9. The meter 13 may be arranged to read in terms of any desired quantity but in the present application of the invention provides a measurement of bearing of aircraft with respect to the geographic location referred to in the preceding paragraph.

In the presently disclosed exemplification of my invention, the pointers 14 and 8 are not of conventional character but are in the shape of segments of a circle, extending across many degrees of arc, the precise extent of arc depending upon the use to which the invention is put, and the choice of the designer. For the sake of example, I propose to utilize pointers 8 and 14, in the shape of circular segments, extending across 36 degrees of arc of the face of the meter, in other words, extending across ten percent of the surfaces of the faces of the meters 9 and 13, respectively. The pointers 8 and 14 themselves are constructed to have base surfaces of weakly reflecting material, such as white enamel. The faces of the meters 9 and 13 themselves are not light reflecting and may, for example, be painted black. The pointers 8 and 14 include thin radial segments 15, 16, of highly reflecting metal or the like, to provide far greater light reflection than does the normal material of the pointers, i. e. the white enamel. The segments 15, 16 occupy positions centrally of the pointers, 8, 14, respectively, so that as the light rays generated by cathode ray tubes 7 and 11 rotate they impinge, respectively, successively on the dark face of the meters 9 and 13, then on the weakly reflecting pointer 8, 14, then on the strongly reflecting segments 15, 16, then again on the weakly reflecting portions of pointers 8, 14 and then again on the non-light reflecting meter faces.

Adjacent to the meters 13 and 9 are located photo-electric cells 20 and 21, respectively. The photo-electric cell 20 picks up light reflected from the pointer 14, and which originates in the flying spot generated by the cathode ray tube 11. The photo-electric cell 21, on the other hand, picks up light reflected from the pointer 8 and originating from the flying spot associated with the cathode ray tube 7. The output of the photo-electric cell 21 will then consist of a periodic series of waves 22 occurring at the rate of one each second and starting at the time when the flying spot associated with tube 7 reaches one edge of the indicating element 8 and terminating when the flying spot reaches the other edge of the indicating element 8. At the center of the wave 22 is a pedestal or raised portion 23 which occurs when the flying spot passes over the extremely light reflecting portion 16 of the pointer 8. The pedestal 23 provided at the output of the photo-cell 22 must, for the purposes of the invention, have a duration equal to the short time base period, or $\frac{1}{30}$ of a second, and for this purpose the bright center element 16 of the pointer 8 is provided as of appropriate width, that is, it has a width of a twelve degrees of arc.

The output pulse 23 is separated from the wave 22 by means of an amplitude discriminator 24 the output of which is applied as a gating wave to the normally blocked amplifier 25, turning that amplifier on for the duration of the pulses 23, that is for a period of $\frac{1}{30}$ of a second, once during each second.

The output of the photo-cell 20 is of similar character to the output of the photo-cell 22 but occurs thirty times in each second and comprises a base wave 26, and a pedestal 27 which may be of relatively narrow width, since its width determines only the duration of the pulses transmitted by the system. The pedestal 27 is separated from the base wave 26 by an amplitude discriminator 28 and is then applied to the input of the normally blocked amplifier 25 for amplification thereby. Since signals corresponding with pedestal 27 occur thirty times in each second, and since the normally blocked amplifier is gated on for a period of only $\frac{1}{30}$ of a second during each second, only one of the thirty pulses provided by the amplitude discriminator 28 during each second is enabled to pass the normally blocked amplifier 25. That pulse is applied as a triggering pulse to the transmitter 30 and results in the transmission of a pulse of electromagnetic energy to all surrounding aircraft and to a ground station. The time position of that pulse, when translated, provides a determination of the bearing and of the range of the transmitting craft, in accordance with principles fully explained in my prior application, referred to in the first paragraph of this specification.

In order fully to determine the position of an aircraft it is essential not only to know its bearing and range, but also that its altitude be known. For the purpose of determining altitude of aircraft in the present system I utilize the principle of frequency discrimination, the transmitter 30 being provided with a tuning condenser 31 which is actuated or tuned by an aneroid cell 32, so that the frequency of the output of the transmitter 30 at all times corresponds with the altitude of the transmitting aircraft. Remote aircraft and ground stations which may be suitably equipped may then receive signals from any given aircraft utilizing the system by properly tuning a pulse receiver to the altitude frequency of the transmitting aircraft, and the plan position or bearing and range of the transmitting aircraft may be determined by measuring the pulse position of the transmitted pulses with respect to the two base time intervals established for the system, thus providing a complete determination of the position of the aircraft.

A pulse receiver 40 may be provided aboard each of the aircraft which may be tunable by means of the condenser 41, which is coupled with aneroid cell 32 just as is the condenser 31 associated with the transmitter 30. The receiver 40 aboard each aircraft, therefore, may be maintained tuned in accordance with the altitude of the aircraft and, accordingly, may receive signals only from other aircraft at or adjacent to its own altitude. Since, however, the pilot of the aircraft may at times desire to know the position of aircraft at other altitudes a manual tuning condenser 43 is provided which enables variations of the tuning of the receiver 40 independently of the position of the condenser 41, enabling the pilot to explore other altitudes than his own for the determination of the presence, range and bearing of other aircraft. Further, receiver 40 may be supplied with a manual variable band width control to enable reception of signals at frequencies corresponding with a plurality or band of altitudes simultaneously.

The output of the pulse receiver 40 may be applied over a pair of cascaded gating amplifiers 44 and 45 which may transmit received pulses to a cathode ray tube indicator 46 and to a facsimile type receiver 47 for indication and recording of the time positions of received pulses. Switches 48 are provided which enable by-passing of either of the gating amplifiers 44 or 45, or of both amplifiers 44 and 45 simultaneously, so that all or any desired selection of received pulses may be applied to the indicators 46 and 47. When it is not desired to know the position of all aircraft adjacent to a given aircraft, but to know only the position of those aircraft which are within a certain distance and within a certain bearing of the given aircraft, or alternatively to know the bearing and position of aircraft having a given bearing and range with respect to a given aircraft, the gating amplifiers 44 and 45 enable rejection of all pulses which do not come within certain ranges of time position, blocking out pulses which do not correspond with aircraft position coming within the desired bearings and ranges.

Considering first the normally blocked gating amplifier 44, it is provided with gating waves by a clipper amplifier 50, the latter being supplied with input corresponding with the gating wave 26, and having the function of removing therefrom the peak 27. Accordingly, the normally blocked amplifier 44 is turned on for a period equal to ten percent of each full second, that ten percent time duration being selected to straddle the time position corresponding with the range of the transmitting aircraft. If, therefore, we assume that the meter 9 measures the total range of 100 miles, pulses transmitted by the gated amplifier 44 must have time positions corresponding with ranges of plus and minus 5 miles, with respect to the range of the transmitting aircraft.

Pulses transmitted by the normally blocked gating wave amplifier 44 must further pass the gating amplifier 45, the latter gating in response to signals supplied by clipper amplifier 51, which derives its signal from the output of the photocell 20, removing from the wave 26 the pedestal 27, and transmitting the resulting flat top wave to the amplifier 44 as the gating wave. It will be recalled that the duration of the gating wave 26 is precisely ten percent of 1/30 of one second, and corresponds with the total bearing of 36 degrees. Accordingly, only pulses having time positions within short time intervals which are plus or minus 18 degrees of arc away from the time position of the transmitted pulse may be received by the system. With both gating wave amplifiers 44 and 45 operating, accordingly, only pulses having time positions corresponding with ranges of plus or minus 5 miles, and bearings of plus or minus 18 degrees, from the position of the transmitting aircraft, may be received aboard that aircraft and translated into indications. Should the pilot, however, desire to know the position of all pulses regardless of bearing or all aircraft regardless of range or of all aircraft regardless of both bearing and range he may accomplish this by suitable operation of the switches 48.

It will be noticed that the gating wave provided by the clipper amplifiers 50 and 51 are locked to the position of the transmitting aircraft. It is desirable for many purposes that the pilot be enabled to gate the amplifier 44 and 45 independently of his own position, that is by manual methods. For this purpose, and in relation to the amplifier 44, a signal is derived from the two-phase generator 3, and applied to a phase shifter 60 which may take the form of a goniometer, that is, a manually rotatable coil moving within a pair of cross coils to which are applied separate phases of the output of the two-phase generator 3. The mechanical position of the manually rotatable coil therefore determines the phase of the voltage which it will pick up from the rotating field produced by the out-phased signals. The output of the phase shifter 60 may be applied to a pulse generator 61 which produces a pulse whenever the output of the phase shifter 60 passes thru a zero value. One of the two pulses so generated may be selected, by reason of the difference of the polarity between each one of each pair of pulses, and may be used to trigger off a square wave generator 62, the output of which constitutes the gating wave. Square wave generator 62 may be a manually adjustable generator which provides square wave output signals of any required duration, i. e. having a duration of only one or two percent of the total time duration of one second to a square wave having a duration equal to the total time period of one second. This means that the amplifier 44 may be gated on at any desired portion of its one second time interval, or for any desired proportion of that time interval, to enable monitoring of the ranges of aircraft within any desired range interval.

For the purpose of providing manually controllable gating in respect to bearing, a cascaded series of (1) phase shifter 63, (2) pulse generator 64 and (3) square wave generator 65 are provided, which operates from the output of the two-phase generator 4, and which in character is precisely similar to the series made up of corresponding elements 60, 61 and 62. The output of the square wave generator 65 is applied to the normally blocked gating amplifier 45 and serves to enable reception of pulses having time positions corresponding with any desired bearing segment.

The problem is now presented of enabling the pilot of any aircraft to determine just what ranges and bearings his gating is adjusted for. If he believes that gating is being accomplished over a given range, and receives no indications, he will believe there is no aircraft within that range, and if he is mistaken it will be to his great distress. For the purpose of delineating the range or bearing segment which is being gated on, I provide a sine wave oscillator 66, which must be of relatively small amplitude output, and which may be connected by means of a switch 67 to the input of the gating amplifier 44. Whenever the amplifiers 44, 45 are in signal passing condition or gated open, signal output from the oscillator 66 will be provided to the indicators 46, 47. These indications will be of very dim character, readily distinguishable from indications provided by the output of the receiver 40, and will appear on the face of the cathode ray tube indicator 46 as a slight brightening of one segment of the face of the indicator, and will appear on the recording surfaces of the facsimile type recorder 47 as a slight darkening of segments of the record receiving surface which correspond with the areas defined by the gates.

Turning now to the method utilized in recording and indicating the values of time position of received signals, the cathode ray tube indicator 46 is of relatively conventional character, comprising a set of deflecting electrodes 70, a radial deflecting electrode 71, and an intensifier grid 72.

The output of the sync receiver 1 is applied to a sawtooth generator 74, synchronizing the output of the latter at the rate of one cycle per second. The output of the sawtooth generator 74, shown at 75, is applied to the radial deflecting anode 71 of the cathode ray tube indicator 46, whereby the cathode ray beam of the indicator 46 is caused to pass from a position centrally of the face of the tube to a position adjacent the outside edge of the tube face, at a uniform rate. The output of the two-phase generator 4 is applied to the deflecting electrode 70 of the indicator 46 causing a continual rotation of the beam of the tube at the rate of thirty times per second. The composite motion of the beam correspondingly is a spiral, which completes one scan of the face of the tube 46, during each second, in a series of rotations of gradually increasing radius, requiring 1/30 of a second for completion of each rotation. Pulses received by the receiver 40 and passed by the gating amplifier 44, 45, or by the by-passing switches 48, are applied to the intensifying electrode 72 of the cathode ray tube indicator 46, creating an intensified spot on the face of the indicator in response to each pulse. Since the time position of the pulses with respect to the 1/30 second interval corresponds with the bearing of a transmitting aircraft, and since the time position of the received pulses with respect to the one second base time interval corresponds to range of the transmitting aircraft, the position of the intensified spot on the face of the cathode ray tube indicator 46 corresponds with the plan position indication of the bearing and range of the transmitting craft.

The facsimile type recorder 47 is provided with a recording electrode 80, which is connected in parallel with the intensifying grid 72 of the cathode ray tube indicator 46. A record receiving surface 81, which is time fed, is shown in section on the drawing, adjacent to the electrode 80. Scanning electrodes 82 and 83 are provided, one of which is driven by the motor 2 and the other of which is driven by the motor 5, and which accordingly are completely synchronized with the basic time intervals of the system. The scanning element 82 extends laterally across the record receiving surface 81 in a manner which is well known per se, and requires 1/30 of a second for one complete scan. The scanning element 83 scans a segment of the record receiving surface 81, but completes each scan in a time period of one second. Accordingly, the lateral position of indications provided on the record receiving surface 81 correspond with range and bearing of transmitted aircraft, on laterally adjacent halves of the surface 81.

There is utilized in the present system, means whereby each pilot of an aircraft may determine not only his own range and bearing on the face of the cathode ray tube indicator but also the ranges and bearings of craft having plan positions falling within predetermined ranges and bearings, which he may set up manually. Further by reason of tuning of the receiver 40 by means of the aneroid cell 41, only those pulses may be received which correspond in frequency with the altitude of the receiving aircraft, so that the range and the bearing of aircraft having different altitudes than the local aircraft are not indicated, unless the pilot so desires. If he so desires, he is enabled to select any desired altitude by means of the manual tuning condenser 43.

We have discussed so far information which is being transmitted from each plane to all other planes flying adjacent a given area and which is received by each of the planes from all of the planes. There is, however, another type of information which is often of great interest aboard an aircraft, but which can only be supplied from a ground station. Information of this type relates to the character of the terrain adjacent a given station or geographic location. It will be noticed that all the information transmitted from the aircraft, in the present system, involves ranges and bearings with respect to a given predetermined location, which may be a landing field, or the like. In accordance with the invention, plan-position terrain maps or charts at various altitudes, and centered about that station, are transmitted from the ground to the various aircraft flying adjacent the station. The maps or charts may be taken at any desired altitude, and, in fact, may be transmitted for each of a plurality of altitudes simultaneously, making use of the fact that altitude, in the present system, corresponds with frequency of transmissions and with tuned frequencies of receivers aboard the various aircraft. Charts at any altitude may be provided, showing in plan objects existing in a plane taken through any desired altitude, and the entire chart may be drawn with the landing field as the center. So, for example, if there is a mountain thirty miles north of a landing field which rises to a height of 6000 feet, the chart for one thousand feet will show, in plan, a section taken through the mountain at the altitude of one thousand feet; the chart for two thousand feet will show likewise a section taken through the mountain at the altitude of two thousand feet, and so on. All the charts will show the location of the section with respect to station, i. e. as bearing north therefrom at a range of thirty miles. Signals deriving from each of the separate charts must, of course, be sent on a different and appropriate altitude frequency, it being desired to receive information aboard each aircraft which pertains only to the altitude at which that aircraft may be flying. In this connection, the chart for zero altitude may be provided with plots of run-ways, to enable blind landing on predetermined run-ways, and the chart for any given altitude may contain lines representing courses which are to be followed by aircraft, in approaching an airport, for example. The pilot, by viewing his cathode ray tube indicator 46, seeing the course lines, and his own position relative thereto, is thereby enabled readily to navigate, and to maintain himself on desired courses.

Figure 2:
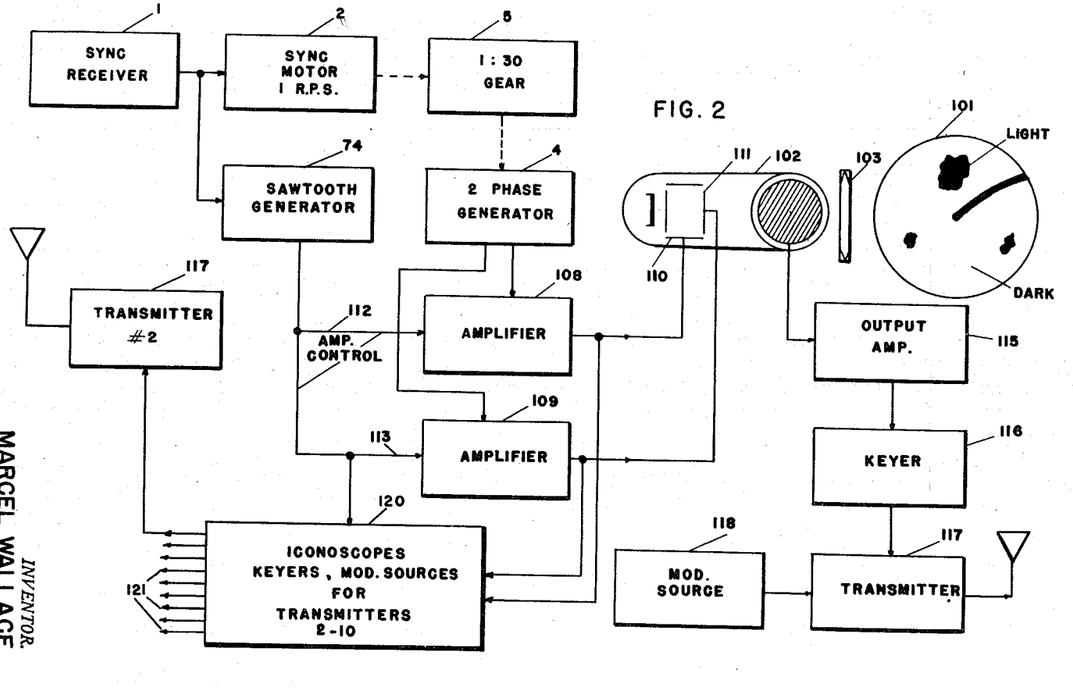
Figure 2 is a functional block diagram of a ground located transmitter for superposing on the synchrometric information provided by the system of the Figure 1, further synchrometric information having significance as to terrain features at predetermined altitudes.

Reference is now made to Figure 2 of the drawings for a view in block diagram of the mechanism located at the ground station for transmitting from the ground station to the aircraft of the system signals representative of sections of the terrain above or at the air station, taken at various altitudes. Maps may be printed for each station, consisting of bright spots corresponding with material objects or desired paths of the given altitude, and with dark spaces where there are no such objects or paths. The map or chart will hereinafter be referred to as an "altitude section" map or chart and discrimination between charts will be obtained by referring to the altitudes at which the sections are taken.

In Figure 2 the altitude section map 101 is shown positioned in front of an iconoscope 182 the representation on the map being impressed on the face of the iconoscope 102 over a lens system represented conventionally at 103. The beam of the iconoscope is caused to trace a spiral path synchronized with the spiral path produced on the face of the cathode ray tube indicator 46 at the various aircraft stations, in the following manner. Synchronizing pulses are picked up at the ground station by a sync receiver 1 which serves to synchronize a one revolution per second motor 2, the latter driving a 30:1 speed increase gear 5. The high speed end of the gearing 5 is utilized to drive a two-phase generator 4 which then has a frequency of 30 cycles per second phased identically with the 30 cycle signals provided by generators 4 aboard the various aircraft. Each of the phases of the output of the generator 4 is applied to the input of separate amplifiers 108 and 109, the outputs of which are applied to mutually perpendicular deflecting plates 110 and 111 of the iconoscope 102. Amplifiers 108 and 109 are subject to amplification control by means of voltage applied over leads 112 and 113. These leads are fed in parallel from a sawtooth generator 74 having a period of one cycle per second and which is synchronized from the output of receiver 1. In this manner the sawtooth voltage is applied as an amplification control voltage to the amplifiers 108 and 109 to change their output amplitude from a value of practically zero to a maximum value determined by the character of the system, at the rate of one time per second. Sawtooth generator 74, therefore, corresponds with the sawtooth generator 74 of Figure 1 and is synchronized therewith. The outputs of the amplifiers 108 and 109 are in 90 degrees phase relation and are applied to the mutually perpendicular deflecting electrodes 110 and 111 of iconoscope 102. The outputs of the amplifiers 108 and 109 increase slowly from a substantially zero value to a maximum value adequate to enable a scanning of the beam of the iconoscope 102 at its maximum radius. This change in amplitude takes place synchronously with the change in voltage of the sawtooth generator 114, whereby the beam of iconoscope 102 scans out a spiral scan which is identical in every way with the spiral scan traced out by the beam of the cathode ray tubes 46, except possibly as to its maximum radius, which depends on the size and character of the iconoscope 102. In tracing out its spiral scan, the beam of the iconoscope in know manner produces signal at the output of the iconoscope, having a zero amplitude while the beam is tracing out a position corresponding with a dark spot on the map 101, and having a maximum value while the beam is tracing out a light spot on the face of the map. Thus signal is produced by the iconoscope 102 which is timed with respect to both time intervals established as base time intervals for the present system, in such manner as to correspond with the bearings and ranges of obstacles at any given altitude in the system. The output of the iconoscope 102 is applied to an output amplifier 115 in known manner, the output amplifier operating a keyer 116 which keys the transmitter 117 off and on in accordance with whether dark or bright spots are present on the map 101 at the then position of the beam of the iconoscope 102. The transmitter 117 transmits at a frequency $f_1$ corresponding with the proper altitude.

The outputs of the amplifiers 108 and 109 may be applied to a series of iconoscopes 102. For example, there may be ten such iconoscopes, although I do not desire to be limited to any specific number. Each iconoscope is provided with an altitude map representative in plan of a section taken at a specific altitude, and each iconoscope feeds a different transmitter which transmits on a frequency appropriate to the altitude corresponding with the altitude section represented on the map. Transmitters, which may be numbered one to ten, are provided with modulation sources 118, which are of sufficiently high frequencies to pass at all times through the receivers aboard the aircraft while the time gates aboard these receivers are open. The block 120 is intended to represent a complex of nine iconoscopes 102, each supplied with an appropriate chart 101, the iconoscopes being respectively associated with keyers 115 and modulation sources 118, and the outputs of the iconoscopes being applied each to an appropriately tuned transmitter 117, over one of the leads 121.

It will now be clear that aboard each of the aircraft of the system are provided indications, restricted to a desired range of altitudes, and to a desired range of bearings and of ranges, which show the plan positions of all adjacent aircraft falling within the said range of bearings, ranges and altitudes, and also the presence of any obstacles falling therewithin.

There is further required at the ground station an indication and a record of the positions of all aircraft operating in the system, and also of aircraft at specific altitudes within the system. It is desired that these indications, or records, be co-related with indications, or records, of the positions of obstacles, so that ground station personnel may take appropriate action when danger of collision, either between planes, or of a plane with an obstacle, appears imminent.

Figure 3:
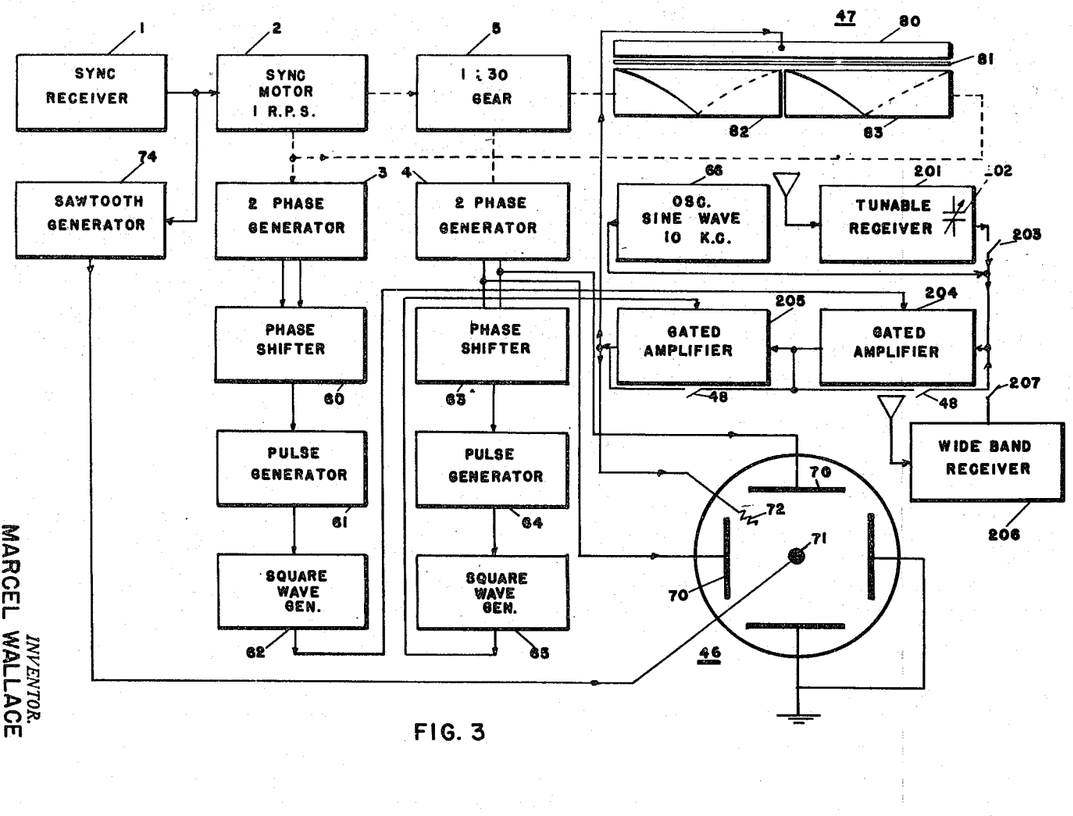
Figure 3 is a functional block diagram of a ground receiver indicator system, in accordance with the invention, providing indications at a ground station of the locations of aircraft in one or more altitude layers, and of the location of terrain features of interest at those altitudes.

Accordingly, each ground station is provided with a pulse receiver 201, which may be tuned manually by means of condenser 202, to enable reception of pulses only at a given altitude layer. The output of the pulse receiver 201 may be applied over a switch 203 to a pair of cascaded amplifiers 204, 205 which are normally biased back beyond cut-off or blocked, and which may be unblocked in response to gating waves.

There may be further applied to the input of the gating amplifiers 204, 205, the output of a pulse receiver 206 which is sufficiently wide band to receive all the signals transmitted from all the aircraft of the system simultaneously. The output of the receiver 206 is applied over a switch 201 to the input of the normally blocked amplifier 204.

There is further applied to the input of the normally blocked amplifier 204 the output of the sine wave oscillator 66, which supplies signal through the gates to the indicators, and which serves to delineate or demarcate the sections of the indication and of the records which are not being blocked out, at any given time, so that the operator may know which ranges and which bearings are operating within his time gates. Gating waves are produced in response to sync signals received by sync receiver 1, the gating wave generators operating precisely in the manner described in detail in connection with Figure 1, and the gating waves being applied to the amplifiers 204, 205 precisely as were the similar gating waves provided in the system of Figure 1 for time gating amplifiers 44, 45. Likewise, the output of the sync receiver 1 is applied to a sawtooth generator 74 which applies its output to the radial deflecting anode 71 of the cathode ray tube indicator 46. The latter operates precisely in the manner of the cathode ray tube indicator of Figure 1. There is further provided a facsimile type receiver 47 which is identical with the receiver 47 of Figure 1 in every respect, which is synchronized, and which receives signals in identical manner. It will be clear that the receiver, indicator and recorder at the ground station are identical with the similar equipment aboard the aircraft, and that the ground station lacks only the means of transmitting pulses which are present aboard the aircraft, and the means for generating gating waves determined in accordance with local range and bearing. These are not required from the ground station, ground station positions being known to all concerned.

Figure 4:
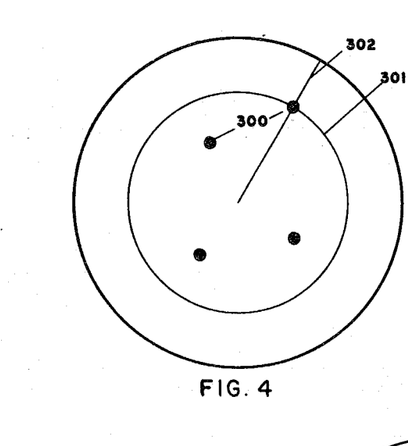
Figure 4 is a representation of the face of a cathode ray tube indicator, as provided in the present system, in connection with ungated reception.

Reference is made to Figure 4 which shows the appearance of the face of the cathode ray tube indicator 46 utilized in the system, and disclosing a number of pips 300, which represent the positions of various aircraft in the system. The appearance of the indicator in Figure 4 represents that produced by an ungated system. The local aircraft may be readily identified by the fact that a pair of lines passes through it, one of the lines being a circle 301 and the other a radial line 302.

Figure 5:
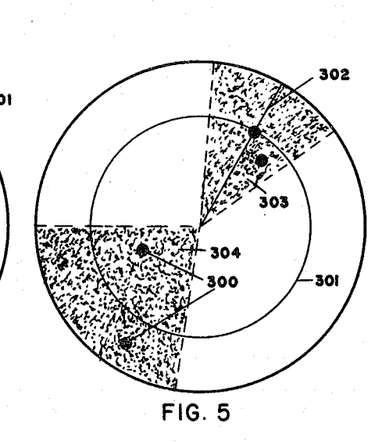
Figure 5 is a representation similar to that of Figure 4, but gated as to bearing.

Figure 5 represents the appearance of the face of the indicator 46 when gating is applied. Two gates are provided, one, 303, being a gate straddling the position of the local craft, and the other, 304, being an arbitrary or manually positionable gate, and the area of these gates is distinguished from the area of the remainder of the face of the indicator 46 by a speckling or subdued glow produced by the presence of a continuous weak signal applied thereto from the source 66 and through the gate of the system. The gate controlled by the local azimuth and range of the local craft, is further readily identified by the fact that it contains a radial line 302 and a section of the circular line 307 which pass through the pip 300 which represents the position of the local aircraft.

Figure 6:
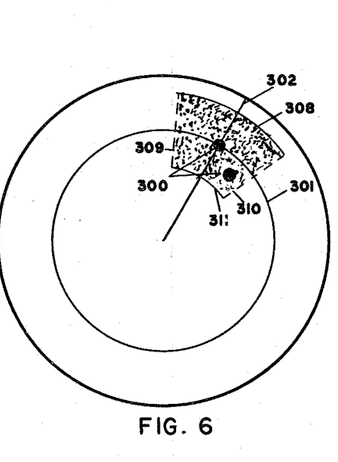
Figure 6 is a representation similar to that of Figures 4 and 5, but gated as to both bearing and range simultaneously.

Figure 6 represents the appearance of the face of the oscilloscope utilized in the system where the gating is applied not only in respect to azimuth but also in respect to range. In this figure the boundary lines of the gate are represented by the lines 308, 309, 310, and 311, and position representative spots are shown only within the boundary of these lines. Two aircraft may be seen located within the gated portion of the display and one of these aircraft corresponds with the local aircraft, which may be identified by the fact that it is located centrally of the gate and further by the fact that it is intersected by a radial line 302, and by a circle 301.

Figures 7, 8:
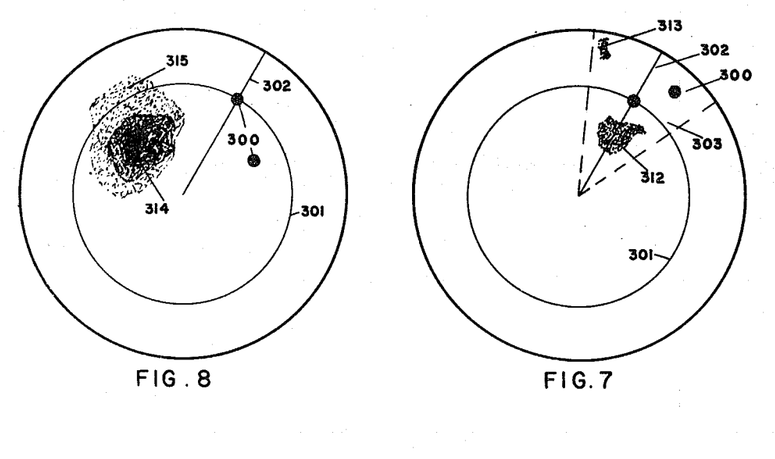
Figure 7 is a representation similar to that of Figure 5 wherein a terrain feature is displayed.
Figure 8 is a view of the face of a cathode ray tube at a ground receiver when receiving simultaneously terrain representative signals for a group of adjacent altitudes.

Figure 7 represents the appearance of the face of the indicator 46 when receiving information from an altitude map section, showing the positions of obstacles 312, 312 and showing the position of the local aircraft with respect to that obstacle. One foreign aircraft 300 is shown on this figure. Figure 8, on the other hand, represents the appearance of the face of the indicator 46 at the ground station when the wide band receiver 206 is connected in circuit. In this case all the altitude sections of the maps are simultaneously received, in superposed relation. If we assume that the display represents a mountain, the sections taken for succeedingly higher altitude 314, are distinguishable from the other sections 305, by the fact that the intensity of illumination on the face of the indicator 46 is greatest for sections representing higher altitudes. This is accounted for by the fact that at higher altitudes signals are received from a plurality of transmitters simultaneously, whereas as the section altitude goes lower and lower, more and more of the altitudes transmitted are cut out by the fact that no superposed sections are present on the maps corresponding with greater altitudes.

Reviewing now the operation of the system, each of a plurality of aircraft, equipped with apparatus as illustrated in Figure 1 of the drawings, receives from a suitable source, and by means of a receiver 1, signals occurring periodically precisely once in each second. This signal is utilized to synchronize a motor 2, which then revolves at the rate of 1 R. P. S. and at a frame or phase determined by the time of occurence of the synchronizing pulses. The motor 2 drives a pair of two-phase generators 3 and 4, the former being driven directly and the latter over a 30:1 speed increase gear. The outputs of the generators 3 and 4 aboard all the aircraft of the system, and at one or more ground stations, are thus precisely in phase and synchronism and locked, one with respect to another.

The outputs of the generators 3 and 4 are utilized to drive a pair of flying spots, produced by a pair of cathode ray tubes 7 and 11, aboard each of the craft, in circular paths, and these "flying spots," are caused to scan the positions of the pointers 8 and 14 of a pair of meters 9 and 13, respectively.

The pointers 8 and 14 are of unconventional character in that each is of slightly light reflecting character, the faces of the meters being non-light-reflecting. The pointers 8 and 14 are further each bisected along a radius by a strongly light reflecting sliver or band, 15 and 16. As the flying spots scan the faces of the meters 9 and 13, light reflected from the said faces is caused to impinge on a pair of photo-cells 20 and 21. Accordingly, the light reflected from the face of meter 13 provides a 30 cycle signal at the output of photo-electric cell 20 in the form of a square wave 26, having superimposed centrally thereon a pedestal 27. The wave 26 is arranged to be $1/300$ second in duration, and the pedestal 27 a few microseconds in duration.

The photo-cell 21 provides a one cycle per second signal in the form of a square wave 22 surmounted at its center by a pedestal 23. The width of the pedestal 23 is required to be $1/30$ second in duration, for the purposes of the present example, i. e. just as great as the interval between pedestals 27. The wave 22 may be of any desired duration, however, and I have, for the sake of example, assumed a duration of 1/30 second.

The pedestal 23 is utilized to establish a gate for a normally blocked transmitting circuit 25, 30 which is keyed or triggered on by the pedestals 27, the pedestals 23 and 27 being separated from the waves 22 and 26, respectively by amplitude discriminating amplifiers 24 and 28 respectively. Hence, of the thirty pedestals 27 generated in each second that one only which occurs during the time of the pedestal 23, causes actual transmission.

The time position of the transmitted pulse is, with respect to the recurrent one second base intervals established for the system, and within a small margin of error, representative of the reading of meter 9, and is almost precisely, with respect to the 1/30 second recurrent time base intervals, representative of the readings of meter 14.

If, now, meter 13 measures bearing with respect to a fixed predetermined location, and if the meter 9 measures range with respect to this same location, the transmitted pulses from each craft represent the geographic location of the craft with respect to the said location and may be so interpreted aboard other craft, or on the ground.

Transmissions are, further, restricted to have significance in accordance with altitude or altitude layers, by tuning the transmitter 30 by means of an aneroid cell 32.

Each aircraft may be provided with a receiver 40, which may likewise be tunable, in correspondence with the tuning of the transmitter 30, by the aneroid cell 40, so that each receiver can receive only signals originating from aircraft at or adjacent to its own altitude. To enable exploration of other altitudes the manual tuning control 43 is provided for tuning the receiver 40 independently of the aneroid cell 32.

Pulse signals received by the receiver 40 are applied to actuate a cathode ray tube indicator 46 and a facsimile recorder 47, but may be time gated with respect to the indicator and recorder to exclude pulses representative of certain ranges, certain bearings or certain combinations of both.

For the purpose of time gating the output of receiver 40 is passed through normally blocked gating amplifiers 44 and 45, in cascade, amplifier 44 being gated on by square wave 22, and amplifier 45 by square wave 26. These square waves, at any receiver, straddle the pulses transmitted by the associated transmitter, and hence permit reception of pulses having a predetermined proximity to the time positions of the transmitted pulses.

Still further gating waves are generated, which may be manually adjusted in respect both to time of occurrence and duration. These derive from the generators 3 and 4, which feed goniometer type phase shifters 60 and 63 respectively, the outputs of which are utilized to generate synchronizing pulses for square wave generators 62 and 65, respectively, these being generators of square waves the duration of which may be varied manually. The gating waves provided by generators 62 and 65 are applied to gated amplifiers 45 and 44, respectively, just as are the gating waves 22 and 26.

The gating wave amplifiers 50, 51, 62 and 65 may be disabled, selectively, by appropriate ones of manual switches 68.

In order to remove all time gating, amplifiers 44 and 45 may be by-passed by switches 48.

Turning now to the method of indicating and recording, a cathode ray tube indicator 46 is provided aboard each of the craft, the beam of which is driven in a circular path by voltages from two phase generator 4, applied to deflecting electrodes 70, at the rate of 30 revolutions per second, and in like phase or frame, aboard all the craft. The beam is given a simultaneous slow radial motion by a one cycle per second sawtooth wave generator 74, synchronized from sync signal receiver 1. Hence each received pulse generates a bright spot on the face of the cathode ray tube indicator 46 at a plan position corresponding with the location of the aircraft aboard which originated the received pulse.

The outputs of the amplitude discriminators 28 and 24 are likewise applied, over isolating amplifiers 19, in parallel, to the intensifying grid 72 of the indicator 46. The output of amplitude discriminator 24 is a pulse at a given range and extending for a complete short base time interval. It causes substantially a circular trace on the face of the indicator 46 at the range of the local craft. The amplitude discriminator 28 supplies a pulse at a given bearing for all altitudes, and hence creates a radial trace at the bearing of the local craft. The intersection of these traces, identified as 302 and 301, in Figures 4 to 8 inclusive of the drawings, represents the location in plan position, of the local aircraft.

The plan positions of all aircraft at a given altitude layer, or at a plurality of such layers simultaneously, may be displayed at the ground station, in the same manner as already explained in connection with reception and display aboard the various aircraft.

The presence of obstacles at any altitude may be indicated aboard the aircraft, by transmitting from the ground signals derived from a section map taken at a desired altitude, the signals being generated by scanning a suitable map 101 by means of an iconoscope 102.

The iconoscope 102 is caused to scan spirally, its motion being totally synchronized and framed with the spiral scans at the indicators 46. The presence of terrain features at a given altitude is signalled by a light reflecting portion, on the map 101, which generates a keying signal for a transmitter 117, modulated at some convenient frequency, say at 10,000 cycles, by a wave of any convenient shape, as a sine wave.

Transmissions from section maps representing sections taken at various altitudes may be transmitted at frequencies corresponding with the altitudes, and any desired number of maps may be scanned simultaneously, for generating of keying signals for suitably tuned transmitters 117.

The mode of translating signals provided by transmitters 117 will be obvious from what has gone before.

The time positions of incoming pulses may be further translated and recorded by a facsimile type recorder 47 the signals being applied to the marking electrode 80, of the recorder, in parallel with the intensifying electrode 72 of the cathode ray tube indicator 46. Two rotating helical scanners are provided, one of which, 82, rotates at the speed of 30 R. P. S. and which is driven by the motor 5, the other, 81 being driven at the rate of speed of 1 R. P. S. by the motor 2. Thereby signals arriving are analyzed in respect to their time positions with respect to both time bases established for the system, one deriving from a 1 R. P. S. signal and the other deriving from a 30 R. P. S. signal. The time positions of received pulses are recorded as longitudinally extending lines the lateral positions of which correspond with the time positions of pulses and accordingly with the azimuth and ranges of each transmitting aircraft.

Various modifications of the present system will suggest themselves to those skilled in the art. For example, instead of relying upon frequency of carrier as representative of altitude, modulations of the carrier may be resorted to for this purpose, which may be sine wave, or pulse duration, or pulse time separation, character, in accordance with techniques now well known in the art.

Further, it is quite feasible to derive 30 cycle synchronizing and time positioned signals from an ODR or omni-directional range, as was described and illustrated in my prior application, referred to in the first paragraph hereof. In connection with this feature, reference is made to Figure 9 of the drawings, wherein is illustrated, in schematic block diagram, a modification of the system of Figure 1, and wherein the output of an ODR, or omni-directional range receiver, is utilized for establishing the short base time interval for the system, independently of the means for establishing the long base time interval. The output of the ODR receiver, further, may be utilized for generating pulses having time positions determined in accordance with bearing from the ODR transmitter, in a manner described and illustrated in my prior application, identified in the first paragraph of this specification, thus obviating the necessity for utilizing cathode ray tube 11 and meter 13 for this purpose.

Figure 9:
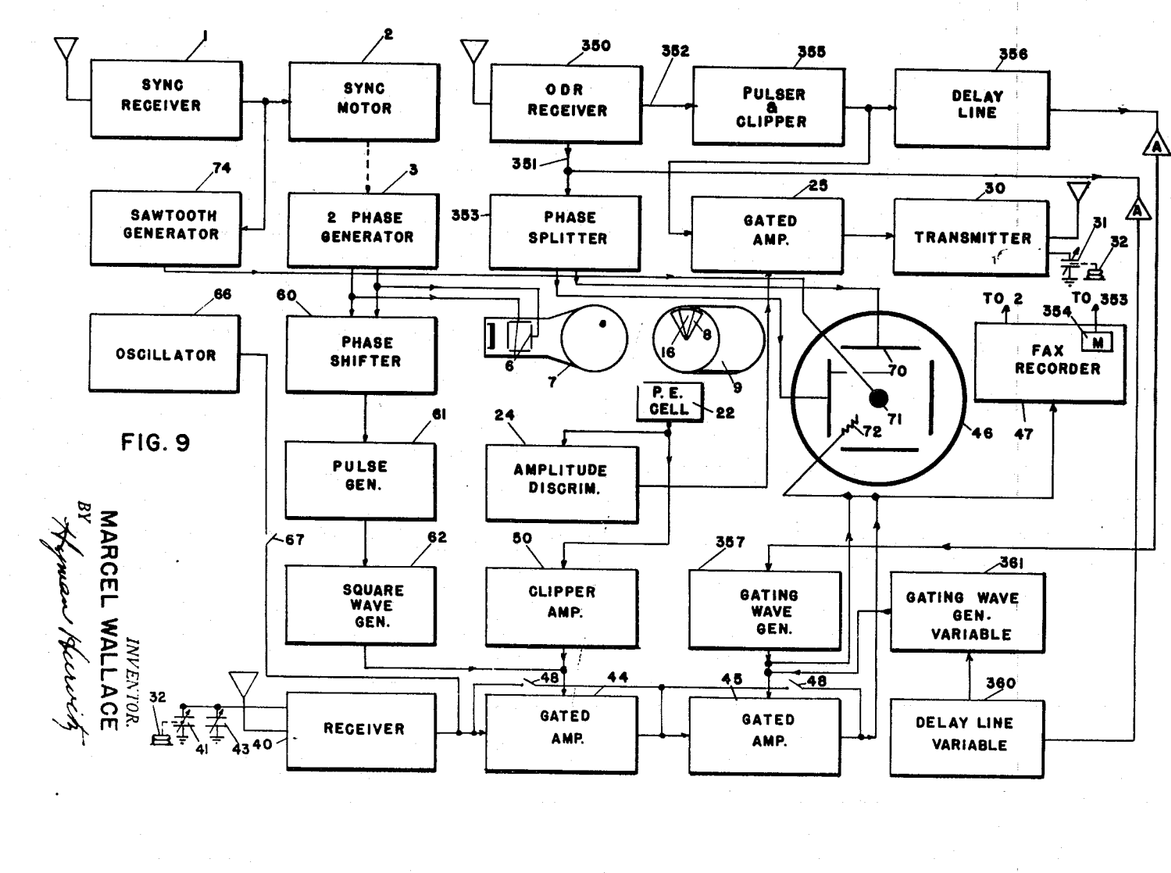
Figure 9 is a functional block diagram illustrating means whereby the embodiment of the invention illustrated in Figures 1 to 3 of the drawings may be enabled to take advantage of transmissions from an omni-directional range receiver in synchronizing or establishing one of the base time intervals of the system.

Obviously, the system of Figure 9 may be employed only in situations wherein azimuthal bearing is one of the telemetric quantities involved, and wherein ODR transmissions are available. The system of Figure 1, on the other hand, is of more general application, the meters 9 and 14 being utilizable for measuring quantities other than range and azimuth, respectively.

Identical elements in the systems of Figures 1 and 9 are identified by the same numerals of reference, and in view of the similarity of the system of Figures 1 and 9, the system of Figure 9 will be described only in respect to those features by virtue of which Figure 9 distinguishes from Figure 1.

Referring now specifically to Figure 9 of the drawings, the reference numeral 350 denotes an ODR receiver, at the output of which are available two thirty cycle per second signals, one of which, supplied by lead 351, is of constant phase and the other of which, supplied by lead 352, is of a phase determined by the bearing of the ODR receiver 350 with respect to the ODR transmitter (not shown).

The voltage on lead 351 is applied to a phase splitter 353, the output of which is applied to the deflecting electrodes 70 of the cathode ray tube indicator 46, to control rotary scan of the beam of the latter, and also to the motor 354 which drives the scanning element 82 of facsimile recorder 47, synchronizing and framing the motion of the motor 354.

The voltage on the lead 352 is applied to the input circuit of pulse generator and clipper 355, which in known fashion provides a pulse in response to each passage of the voltage applied to it, through zero. The clipper selects the positive one of the pulses, applying same to the input circuit of the gated amplifier 25, in place of pulse 27 of the system of Figure 1.

The positive pulse referred to in the previous paragraph is further applied to a delay circuit 356, which delays the pulse for 95% of 1/30 second, so that at the output of the delay circuit 356 are pulses which may be considered to be advanced with respect to the input pulses by a time equal to 5% of the pulse repetition period. The output pulse is applied to a gating wave generator 357 which generates, without delay, a square wave in response to each pulse applied thereto, the square gating wave having a duration equal to 10% of the pulse repetition period, or 1/300 second. The latter wave, then, straddles the pulse applied to the input of the gated amplifier 25, and may be applied, via amplifier 19 to the intensifier grid 72 of the cathode ray tube indicator 46, as a local azimuth marker. This same gating wave may further be applied to the normally blocked amplifier 45, in place of the output of clipper and amplifier 51, of Figure 1.

In order to provide a variable or manually controllable gating wave in systems utilizing the ODR signals the signal of constant phase available at the lead 351 is applied over an isolating amplifier to the input of a manually controllable delay line 360, which places the output pulse at any desired time position over the 1/30 second base time interval of the system. The output of the variable delay line 360 is applied to a gating wave generator 361, which, in response to each input pulse provides a square gating wave the duration of which is subject to manual control. The output of the gating wave generator 361 is applied as a gating signal to the gated amplifier 45, in parallel with the output of gating wave generator 357.

In the embodiment of the invention illustrated in Figure 9 of the drawings, the output of gating wave generator is applied, via isolating amplifier 19, to the grid 72 of indicator 46, to draw an arc at a range corresponding with the range of the local aircraft. Since the gating wave provided by gating wave generator 357 endures only for the duration of the gate, the arc likewise will be of limited extent, and generally will not extend for a complete circle, but rather for the duration of the gate only. As a variation from the system of Figure 1, furthermore, no provision is made for a radial line at the bearing of the local aircraft, although such provision might readily be made, if desired, by applying the output of pulser and clipper 355 to the grid 72 of the indicator 46, over an isolating amplifier.

The transmitter 30, in the embodiment of Figure 9, may be tunable by means of a tuning condenser 31, which is controlled by means of an aneroid cell 32, as in Figure 1. The pulse receiver 40, likewise may be manually tunable, by means of condenser 43, and automatically tunable by means of condenser 41, which may be actuated by aneroid cell 32 to provide duplication of tuning between receiver 40 and transmitter 30. The receiver may be provided with manually controllable variable selectivity control, to enable reception of signals corresponding with a plurality of different altitudes simultaneously, or all altitudes, simultaneously.

In systems wherein ODR transmissions are relied on to establish the short time base period, and the time positions of the bearing representative pulses, i. e. in systems of the type illustrated in Figure 9 of the drawings, it will likewise prove advantageous to drive the 30 cycle two phase generators 4, at the ground stations of the system (Figures 2 and 3), from a motor synchronized by the fixed phase output of an ODR receiver, instead of from gearing 5 and motor 2, as presently shown and described. Illustration of this feature is not provided, to avoid unnecessary extension of the drawings.

While I have illustrated and described specific forms of certain embodiments and features of my invention, as required by the statutes relating to Letters Patent of the United States, it will be clear that variations of detail, as well as of the general arrangement, may be resorted to, without departing from the true scope and spirit of the invention, which is defined in the appended claims.

What I claim and desire to secure by Letters Patent of the United States is:

1. In combination, a first station having means for delimiting a first periodic time interval, means for delimiting a second time interval, means for providing repetitive periodic signals at time positions within said first time intervals which correspond with the value of a first measurable quantity, means for providing a signal at a time position within said second time interval which corresponds with the value of a second measurable quantity, means for transmitting at least one of said periodic signals selected in accordance with the time position of the other of said signals, a second station having means for receiving said one of said periodic signals, and comprising time gating means for selectively receiving or rejecting said one of said periodic signals in accordance with its time position within at least one of said periodic time intervals.

2. In combination, a first station having means for transmitting pulses having time positions simultaneously with respect to each of a pair of repetitive time intervals, the time positions of said pulses with respect to each of said pair of intervals being representative of the value of a measurable quantity, a remote receiver for said pulses, said receiver comprising means for rejecting pulses occurring without a predetermined range of times within at least one of said time intervals.

3. The combination in accordance with claim 2 wherein said means at said remote receiver for rejecting pulses occurring without a predetermined range of one of said time intervals comprises means for rejecting pulses occurring simultaneously without a predetermined range of the other of said time intervals.

4. The combination in accordance with claim 3, wherein the said predetermined ranges are individually selectable and adjustable in respect to time position and time duration, respectively.

5. The combination in accordance with claim 2 wherein said predetermined range is selectable in respect to time position.

6. The combination in accordance with claim 2 wherein said predetermined range is variable in respect to time duration.

7. In combination, a plurality of relatively remote stations having each means for generating and transmitting pulses, each pulse having time positions simultaneously with respect to each of a pair of repetitive time intervals, said time intervals being common to each of said stations, and the time positions of said pulses generated and transmitted at each of said stations having time positions simultaneously with respect to both of said time intervals which are determined with respect to each of said time intervals by the value of a pair of telemetric quantities, receiving means for said pulses at each of said stations, and gating means for excluding from the output of said receiving means any of said station's pulses having a predetermined range of values of time position within at least one of said time intervals.

8. The combination in accordance with claim 7, wherein gating means are provided for excluding from the output of said receiving means at any of said stations pulses having a predetermined range of values of time position within the other of said time intervals.

9. The combination in accordance with claim 7 wherein said means for excluding is controllable in respect to the time position and the time duration of said range of values.

10. The combination in accordance with claim 7 wherein said gating means is controllable automatically in response to the value of at least one of said pair of quantities.

11. In combination, a transmitter for generating and transmitting pulses having a variable characteristic, means for determining a value of said variable characteristic in accordance with a value of a first parameter, means for determining the time positions within predetermined repetitive time base intervals of pulses generated by said transmitter, in accordance with the value of a further parameter, and means for determining time positions within a further time interval of generated pulses transmitted by said transmitter, in accordance with the value of still a further parameter.

12. In combination, a plurality of elevated stations, each station having a tunable pulse transmitter, means for tuning the transmitter at each of said stations in accordance with the elevation of said station and within a predetermined spectrum of frequencies, whereby to transmit from each station pulses having a carrier frequency within said spectrum corresponding with said elevation of said each station, and means for determining the time positions of pulses, at any of said stations, simultaneously with respect to a pair of different time intervals, in accordance with the respective values of a pair of quantities.

13. The combination in accordance with claim 12 and further comprising a receiver at at least one of said stations, said receiver being tunable to receive signals over a limited spectrum included within said predetermined spectrum, said receiver comprising means for translating the time positions of received ones of said pulses with respect to said pair of different time intervals into indications representative of the values of said pair of quantities.

14. In combination, a first station, a chart at said first station, means for scanning the elements of area of said chart in sequence and for generating a corresponding sequence of signals, a characteristic of each signal of said sequence of signals being representative of an optical value of the element of area of said chart corresponding with said each signal, a transmitter at said first station, means for tuning said transmitter in accordance with a characteristic of said chart, a remote receiver, and means for tuning said receiver automatically in response to altitude of said receiver within a band of frequencies including the frequency of tuning of said transmitter, and means coupled to said receiver for duplicating said chart.

15. In combination, a first station, a chart at said first station, electron-optic means for repetitively scanning a first co-ordinate of said chart in a first time interval and for scanning a second co-ordinate of said chart in a second time interval, said second time interval containing a time adequate for a plurality of said repetitive scans, said electron-optic means comprising means for generating a first signal having a characteristic determined by an optical value of an element of said chart at the instant of scan thereover, a craft having means for generating a further signal having a time position within each of a pair of time intervals corresponding with the value of a pair of geographic co-ordinates pertaining to said craft, each of said time intervals coinciding with a different one of said two first mentioned time intervals, means for transmitting said first signals, means for transmitting said further signal, and means for receiving and compositely indicating said further signal and said first signals.

16. In combination, means for generating signals timed simultaneously with respect to a plurality of time bases, means for transmitting said signals, means for receiving said signals, means for translating the timing of said signals into spatial indications, and means for disabling said translating means for certain time ranges in at least one of said time bases.

17. In combination, means for delimiting aboard each of a plurality of craft a pair of discrete time intervals, means for transmitting from each of said craft a single pulse having a time position of telemetric significance simultaneously with respect to both time intervals of said pair of discrete time intervals, means for receiving and translating said pulse into indications of the values of said telemetric quantities, said last named means being operative for certain fractional portions only of at least one of said time intervals.

18. In combination, means for delimiting a first periodic time interval, means for delimiting a second time interval, means for providing repetitive periodic signals at time position within said first time interval which correspond with the value of the first measurable quantity, means for providing a signal at a time position within said second time interval which corresponds with the value of a second measurable quantity, means for transmitting at least one of said periodic signals selected in accordance with the time position of the other of said signals, and a receiver indicator means adapted for receiving said at least one of said periodic signals during fractional portions only of at least one said time intervals.

19. The combination in accordance with claim 18 wherein said receiver indicator means comprises a cathode ray tube indicator having a face, means for establishing a pair of coordinates on said face, and means for providing indications on said face with respect to said pair of coordinates in accordance with the time position of said at least one of said periodic signals with respect to said first and second time intervals only when said at least one of said periodic signals falls within a predetermined fractional portion of at least one of said time intervals.

20. The combination in accordance with claim 18 wherein said receiver indicator means comprises a cathode ray tube indicator having a scanning cathode ray beam, and a face scanned by said beam, means for scanning said beam in one coordinate of a coordinate system in synchronism with one of said time intervals, means for scanning said beam in another coordinate of said co-ordinate system in synchronism with the other of said time intervals, means responsive to reception of said at least one signal for modifying said cathode ray beam, and means for blanking said means during at least a part of at least one of said coordinates.

21. In combination, an omni-directional radio beacon transmitter for providing two cyclic signals, one of equal phase omni-directionally and the other of phase dependent upon bearing from said transmitter, means aboard each of a plurality of aircraft for receiving said signals from said transmitter, means aboard each of said aircraft for generating periodic signals having a time characteristic dependent upon the relative phases of said two signals, means for delimiting periodic time intervals common to said plurality of craft and comprising a plurality of periods of said periodic signals, and means for selecting and transmitting one only of said periodic signals from each of said craft during each of said further time intervals in a time position determined with respect to said further time intervals by the value of a navigational parameter aboard each of said craft, and time gated remote receiving and indicating means for said periodic signals conditioned to receive selected ones only of said periodic signals.

22. In combination, means for delimiting first periodic time intervals each of the same duration, means for delimiting a second time interval having a duration equal to a predetermined integral number of said first periodic time intervals, means for providing repetitive periodic signals at time positions within said first time intervals which correspond to the value of a first measurable quantity, means for providing a signal at a time position within said second time interval which corresponds with the value of a second measurable quantity, said last named signals having a time duration equal to one of said first periodic time intervals, means for transmitting that one only of said periodic signals which over-laps in time the time position of the other of said signals, a receiving station having means for receiving said periodic signals, said receiving station comprising gating means for selectively receiving or rejecting said one only of said periodic signals in accordance with its time position within at least one of said periodic time intervals.

23. In combination, means for delimiting first periodic time intervals each of the same duration, means for delimiting a second time interval having a duration equal to a predetermined integral number of said first periodic time intervals, means for providing repetitive periodic signals at time positions within said first time intervals which correspond to the value of a first measurable quantity, means for providing a signal at a time position within said second time interval which corresponds with the value of a second measurable quantity, said last named signal having a time duration equal to one of said first periodic time intervals, means for transmitting that one of said periodic signals which over-laps in time the time position of the other of said signals, a receiving station having means for receiving one of said periodic signals, said receiving station comprising time gating means for selectively receiving or rejecting said one of said periodic signals in accordance with its time position within said periodic time intervals and in accordance with its time position with respect to said second time interval.

24. In combination, a first station having means for transmitting pulses having time positions simultaneously with respect to each of a pair of repetitive time intervals, the time positions of said pulses with respect to each of said pair of intervals being representative of the value of a measurable quantity, a remote receiver for said pulses, said receiver comprising means for rejecting pulses occurring without a predetermined range of times within both of said time intervals.

25. In combination, a plurality of elevated stations, each station having a tunable pulse transmitter, means for tuning the pulse transmitter at each of said stations in accordance with the elevation of said station and within a predetermined spectrum of frequencies, whereby to transmit from each station pulses having a carrier frequency within said spectrum corresponding with said elevation of said station, means at each of said stations for delimiting first periodic time intervals, means at each of said stations for delimiting a second time interval over-lapping a plurality of said periodic time intervals, means at each station for providing repetitive periodic signals at time positions within said first time intervals which correspond with the value of a first measurable quantity, means at each station for providing a signal at a time position within said second time interval which corresponds with a value of a second measurable quantity, means at each station for transmitting one of said periodic signals selected in accordance with the time position of the other of said signals, a receiving station having means for receiving said one of said periodic signals, said receiving station comprising time gating means for selectively receiving or rejecting said one of said periodic signals in accordance with its time position within at least one of said periodic time intervals, and means at said receiving station for determining the frequency of said pulses.

26. In combination, a plurality of elevated stations, each station having a tunable pulse transmitter, means for tuning the transmitter at each said station in accordance with the elevation of said station and within a predetermined spectrum of frequencies, whereby to transmit from each station pulses having a carrier frequency within said spectrum corresponding with said elevation of said each station, means for determining the time position of said pulses at each of said stations simultaneously with respect to each of a pair of repetitive time intervals, said time intervals common to all of said stations, the time positions of said pulses with respect to said pair of intervals being representative of the value of a measurable quantity, a remote receiver for said pulses, said receiver comprising means for rejecting pulses occurring without a predetermined range of time within at least one of said time intervals, said remote receiver further comprising means for receiving only signals having carrier frequencies within a predetermined portion of said predetermined spectrum of frequencies.

27. In combination, a first station, means for supplying synchronizing signals to said first station, first means at said first station for measuring the value of a first variable quantity, second means at said first station for determining the value of a second variable quantity, third means at said first station for receiving said synchronizing signals, fourth means at said first station for generating first periodic pulses having time positions determined by said synchronizing signals and by said value of a first variable quantity, fifth means at said first station for generating second periodic pulses having time positions determined by said synchronizing signals and by said value of said second variable quantity, the period of said second periodic pulses including a predetermined number of periods of said first periodic pulses, and the duration of each of said second periodic pulses being equal to the period of said first periodic pulses, a pulse transmitter normally maintained inoperative to transmit, means for applying said first periodic pulses to said transmitter for transmission thereby, means responsive only to said second periodic pulses for rendering said transmitter operative to transmit said first periodic pulses, a second station, means at said second station for receiving pulses transmitted by said transmitter, means at said second station for receiving said synchronizing signals, means at said second station responsive to said synchronizing signals for generating periodic gating waves having a repetition rate equal to the repetition rate of at least one of said periodic pulses, an indicator, and means responsive to said gating wave for excluding from or transmitting to said indicator pulses received by said means at said second station for receiving pulses transmitted by said transmitter.

28. In combination, a first station, a second station, means for supplying synchronizing signals to said first station and to said second station, first means at said first station for there measuring the value of a first quantity, first means at said second station for there measuring the value of a first quantity, second means at said first station for there measuring the value of a second quantity, second means at said second station for there measuring the value of a second quantity, third means at said first station for receiving said synchronizing signals, third means of said second station for receiving said synchronizing signals, fourth means at said first station for generating first periodic pulses having time positions determined by said synchronizing signals and by said value of a first quantity as measured at said first station, fourth means at said second station for generating first periodic pulses having time positions determined by said synchronizing signals and by said value of said second quantity as measured at said second station, fifth means at said first and second stations for generating second periodic pulses having time positions determined by said synchronizing signals and by said values of said second quantity as measured at said first and second stations, respectively, the period of said second periodic pulses at both said stations including a predetermined number of periods of said first periodic pulses, and the duration of each of said second periodic pulses being equal to the period of said first periodic pulses, a pulse transmitter at each of said stations normally maintained inoperative to transmit, means at said first station for applying said first periodic pulses generated at said first station to said transmitter at said first station for transmission thereby, means responsive only to said second periodic pulses generated at said first station for rendering said transmitter at said first station operative to transmit said first periodic pulses at said first station, means for applying said first periodic pulses generated at said second station to said transmitter at said second station for transmission thereby, means responsive only to said second periodic pulses generated at said second station for rendering said transmitter at said second station operative to transmit said first periodic pulses generated at said second station, means at each of said stations for receiving pulses transmitted by the other of said stations, means at each of said stations responsive to said synchronizing signals for generating periodic gating waves having a repetition rate equal to the repetition rate of at least one of said periodic pulses, an indicator at each of said stations, and means responsive to said gating waves at each of said stations for excluding from or transmitting to said indicator at each of said stations pulses received by said means at each of said stations for receiving pulses transmitted by said transmitter at the other of said stations.

29. In combination, a plurality of stations, means for supplying synchronizing signals to said plurality of stations, first means at each of said plurality of stations for measuring the value of a first quantity at each of said plurality of stations, second means at each of said plurality of stations for determining the value of a second quantity at each of said plurality of stations, third means at each of said stations for receiving said synchronizing signals, fourth means at each of said stations for generating first periodic pulses having time positions at each of said stations determined by said synchronizing signals and by said value of a first quantity as measured at each of said stations, fifth means at each of said stations for generating second periodic pulses having time positions determined by said synchronizing signals and by said value of said second quantity as measured at each of said stations, the period of said second periodic pulses including a predetermined number of periods of said first periodic pulses, and the duration of each of said second periodic pulses being equal to the period of said first periodic pulses, pulse transmitters at each of said stations, said pulse transmitters being normally inoperative to transmit, means for applying said first periodic pulses at each of said stations to said transmitter at each of said stations for transmission thereby, means responsive only to said second periodic pulses at each of said stations for rendering said transmitter at each of said stations operative to transmit said first periodic pulses, means at each of said stations for receiving pulses transmitted by the transmitters at the remaining ones of said stations, means at each of said stations responsive to said synchronizing signals for independently generating periodic gating waves having a repetition rate equal to the repetition rate of at least one of said periodic pulses, an indicator at each of said stations, and means responsive to said gating waves at each of said stations for excluding from or transmitting to said indicator at each of said stations pulses received by said means at each of said stations for receiving pulses transmitted by the transmitters at the remaining ones of said station.

30. In a navigational system for aircraft, means for delimiting first periodic time intervals aboard an aircraft, means for delimiting a second time interval aboard said aircraft, means for providing repetitive periodic signals at time positions within said first time intervals which correspond with bearing of said aircraft with respect to a predetermined geographic location, means for providing a signal at a time position within said second time interval which corresponds with the range of said aircraft with respect to said predetermined geographic location, means for transmitting at least one of said periodic signals selected in accordance with the time position of the other of said signals, a station having means for receiving said one of said periodic signals, and comprising time gating means for selectively receiving or rejecting said one of said periodic signals in accordancec with its time position within at least one of said periodic time intervals.

31. In combination, a navigational system for aircraft comprising, means aboard first aircraft for delimiting first periodic time intervals, means aboard said aircraft for delimiting a second time interval, means for providing repetitive periodic signals at time positions within said first time intervals which correspond with the bearing of said aircraft with respect to a fixed geographic location, means for providing a signal at a time position within said second time interval which corresponds with the range of said aircraft with respect to said fixed geographic location, means for transmitting one only of said periodic signals selected in accordance with the time position of the other of said signals, means aboard a second aircraft for receiving one of said periodic signals, said last named means comprising time gating means for selectively receiving or rejecting said one of said periodic signals in accordance with the relative positions of said second aircraft and said first aircraft.

32. In combination, in a navigational system for aircraft, means aboard an aircraft for transmitting pulses having time positions simultaneously with respect to each of a pair of repetitive time intervals, the time positions of said pulses with respect to each of said pairs of intervals being representative of the value of a navigational parameter of said aircraft, a remote receiver for said pulses, said receiver comprising means for rejecting pulses occurring without a predetermined range of values of each said parameters.

33. In combination, in a navigational system for aircraft, means aboard an aircraft for transmitting pulses having time positions simultaneously with respect to each of a pair of repetitive time intervals, the time position of said pulses with respect to each of said pairs of intervals being representative of the value of a navigational parameter as determined aboard said aircraft, a remote receiver for said pulses, said receiver comprising means for rejecting pulses occurring without a predetermined range of values of one of said navigational parameters.

34. In a navigational system for aircraft, means aboard an aircraft for transmitting pulses having time positions simultaneously with respect to each of a pair of repetitive time intervals, the time positions of said pulses with respect to each of said pair of intervals being representative of the value of a navigational parameter as determined aboard said aircraft, a remote receiver for said pulses, said remote receiver comprising means individually selectable and adjustable for rejecting pulses provided by said aircraft and representative of selective and adjustable ranges of values of said navigational parameters.

35. In a navigational system for aircraft, a tunable pulse transmitter aboard each of said aircraft, means for tuning said tunable pulse transmitter aboard each of said aircraft in accordance with the elevation of said aircraft and within a predetermined spectrum of frequencies representative of a predetermined range of elevations, whereby to transmit from each station pulses having a carrier frequency within said spectrum corresponding with elevation of said aircraft, means at each of said stations for providing two groups of repetitive time base intervals, the time base intervals of the separate groups having distinguishable time durations, means for determining the time position of transmitted pulses from each of said stations with respect to one of said groups of time intervals in accordance with the range of said aircraft with respect to a fixed geographic location, and means for simultaneously determining the time position of said pulses at each of said aircraft with respect to the second of group of time intervals in accordance with the range of said aircraft from said fixed geographic location, whereby each single pulse transmitted from each of said aircraft conveys intelligence concerning the elevation of said aircraft and the range and bearing of said aircraft with respect to said fixed geographic location.

36. In combination, in a navigational system for aircraft, means for establishing first periodic time intervals, means for establishing second periodic time intervals, means for providing groups of first repetitive periodic signals at time positions within said first periodic time intervals which correspond with the value of the bearing of said aircraft, means for providing further signals at time positions within said second time intervals which correspond with the value of the range of said aircraft, means for transmitting one only of each group of said first periodic signals selected in accordance with time positions of the other of said periodic signals, and a receiver indicator means adapted for periodically receiving said transmitted signals during identical fractional portions only of each of at least one of said time intervals.

37. In a navigational system, an omni-directional radio range beacon transmitter for providing two cyclic signals, one of said cyclic signals having equal phase omni-directionally from said transmitter, and the other of said cyclic signals having a phase dependent upon bearing from said transmitter, means aboard a remote aircraft for receiving said two cyclic signals from said omni-directional radio range beacon transmitter, means aboard said aircraft for generating periodic signals having time positions with respect to the period of said first of said two cyclic signals which is determined by the bearing of said aircraft with respect to said transmitter as measured by the phase of the other of said two cyclic signals, means for delimiting aboard said aircraft further periodic time intervals comprising each a plurality of periods of said cyclic signals, means for delimiting a gating wave having a time position with respect to said periodic time intervals which is determined in accordance with the range of said aircraft with respect to said transmitter, said gating wave having a time duration equal to the period of said cyclic signals, a normally inoperative transmitter aboard said aircraft, said transmitter having an input circuit and an output circuit, means for applying said periodic pulses to said input circuit, means for applying said gating wave to said transmitter to render such transmitter operative for the duration of said gating waves only, whereby only such of said pulses applied to the input circuit of said transmitter as overlap the time position of said gating wave generate pulses at the output circuit of said transmitter, a remote receiver for receiving pulses transmitted by said pulse transmitter and means for disabling said remote receiver to receive said pulses transmitted by said pulse transmitter except while said remote receiver is located within predetermined ranges and bearings from said beacon transmitter.

38. The combination in accordance with the preceding claim, wherein means for disabling said remote receiver comprises means for receiving said cyclic signals, means at said receiver responsive to said other of said cyclic signals for generating a gating wave having adjustable duration and having a time position with respect to said one of said cyclic signals determined by the phase of said other of said cyclic signals, and means for applying said gating wave to said receiver for rendering said receiver operative only for the duration of said gating wave.

39. In combination, a first station having means for delimiting a first periodic time interval, means for delimiting a second time interval comprising at least a plurality of said first periodic time intervals, means for providing repetitive periodic signals at time positions within said first time intervals which correspond with the value of a first measurable quantity, means for providing a signal at a time position within said second time interval which corresponds with the value of a second measurable quantity, said last named signal having a duration equal to said first periodic time interval, means for transmitting that one of said periodic signals which overlaps in time the time position of said last named signal, a remote station for receiving said transmitted signals, said remote station comprising means for permanently recording the time positions of said transmitted signals with respect to said periodic time intervals and said second time interval and for excluding from said means for recording transmitted signals having a predetermined range of time positions with respect to at least one of said time intervals.

40. In combination, means for transmitting pulses having time positions simultaneously with respect to each of a pair of repetitive time intervals, the time positions of said pulses with respect to each of said pair of intervals being representative of the value of a different measurable quantity, a remote receiver for said pulses, said receiver comprising means for rejecting pulses occurring without a predetermined range of times within at least one of said time intervals and a recorder for recording time positions with respect to both of said repetitive time intervals of pulses accepted by said receiver.

41. In combination, means for transmitting pulses having time positions simultaneously with respect to each of a pair of repetitive time intervals, the time positions of said pulses with respect to each of said pair of intervals, being representative of the value of a different measurable quantity, a remote receiver for said pulses, said receiver comprising means for rejecting pulses occurring without a predetermined range of times within at least one of said time intervals, a recorder comprising a first successive line scanning marker and a record receiving surface, a second successive line scanning marker and a record receiving surface, means for synchronizing scanning of the first of said successive line scanning markers with the first of said repetitive time intervals, means for synchronizing scanning of said second line scanning marker with the second of said pair of repetitive time intervals, and means responsive to the output of said receiver for actuating said markers to create marks on said record receiving surfaces simultaneously in response to each of said pulses received by said remote receiver.

42. In combination, a first station, means for supplying synchronizing signals to said first station, first means at said first station for measuring the value of a first quantity, second means at said first station for determining the value of a second quantity, third means at said first station for receiving said synchronizing signals, fourth means at said first station for generating first periodic pulses having time positions determined by said synchronizing signals and by said value of a first quantity, fifth means at said first station for generating second periodic pulses having time positions determined by said synchronizing signals and by said value of said second quantity, the period of said second periodic pulses including a predetermined number of periods of said first periodic pulses, and the duration of each of said second periodic pulses being equal to the period of said first periodic pulses, a pulse transmitter normally maintained inoperative to transmit, means for applying said first periodic pulses to said transmitter for transmission thereby, means responsive only to said several periodic pulses for rendering said transmitter operative to transmit said first periodic pulses, a second station, means at said second station for receiving pulses transmitted by said transmitter, means at said second station for receiving said synchronizing signals, means at said second station responsive to said synchronizing signals for generating periodic gating waves having a repetition rate equal to the repetition rate of at least one of said periodic pulses, an indicator and means responsive to said gating waves for excluding from or transmitting to said indicator pulses received by said means at said second station for receiving pulses transmitted by said transmitter.

43. In combination, means for delimiting a first time interval, means for delimiting a second time interval having a duration greater than ten times the duration of said first time interval, a normally inoperative signal receiver, means for establishing a time gate having a duration less than that of said time interval and a time manually adjustable to any time position within said first time interval, means for establishing a second time gate having a duration less than that of said second time interval and a time manually adjustable to any time position within said second time interval, and means responsive to simultaneous occurrence only of said time gates for rendering operative said normally inoperative signal receiver.

MARCEL WALLACE.

REFERENCES CITED

The following references are of record in the file of this patent:

UNITED STATES PATENTS

| Number | Name | Date |
|---|---|---|
| 1,965,046 | Methlin | July 3, 1934 |
| 2,157,122 | Dunmore | May 9, 1939 |
| 2,184,355 | Libman | Dec. 26, 1939 |
| 2,225,046 | Hunter | Dec. 17, 1940 |
| 2,248,215 | Budenbom | July 8, 1941 |
| 2,252,083 | Luck | Aug. 12, 1941 |
| 2,253,958 | Luck | Aug. 26, 1941 |
| 2,321,971 | Becker | June 15, 1943 |
| 2,403,603 | Korn | July 9, 1946 |
| 2,421,106 | Wight et al. | May 27, 1947 |
| 2,434,531 | Wilson | Jan. 13, 1948 |
| 2,437,242 | Cole et al. | Mar. 9, 1948 |

FOREIGN PATENTS

| Number | Country | Date |
|---|---|---|
| 245,763 | Great Britain | Jan. 1, 1926 |
| 518,348 | France | Dec. 28, 1920 |